United States Patent
Towns et al.

(10) Patent No.: US 7,074,884 B2
(45) Date of Patent: Jul. 11, 2006

(54) CONJUGATED POLYMER PREPARATION VIA SUZUKI-COUPLING IN EMULSION

(75) Inventors: Carl Towns, Stansted (GB); Paul Wallace, Royston (GB)

(73) Assignee: Cambridge Display Technology, Limited (GB)

( * ) Notice: Subject to any disclaimer, the term of this patent is extended or adjusted under 35 U.S.C. 154(b) by 0 days.

(21) Appl. No.: 10/493,650

(22) PCT Filed: Oct. 22, 2002

(86) PCT No.: PCT/GB02/04752

§ 371 (c)(1),
(2), (4) Date: Oct. 4, 2004

(87) PCT Pub. No.: WO03/035713

PCT Pub. Date: May 1, 2003

(65) Prior Publication Data

US 2005/0037230 A1 Feb. 17, 2005

(30) Foreign Application Priority Data

Oct. 25, 2001 (GB) .................................. 0125621.3

(51) Int. Cl.
*C08G 79/08* (2006.01)
*B32B 9/00* (2006.01)

(52) U.S. Cl. .............................. 528/394; 528/4; 528/8; 528/397; 428/690; 428/917

(58) Field of Classification Search ................ 528/394, 528/4, 8, 397; 428/690, 917
See application file for complete search history.

(56) References Cited

U.S. PATENT DOCUMENTS 5,621,131 A 4/1997 Kreuder et al. ............... 558/46
5,777,070 A 7/1998 Inbasekaran et al. ....... 528/394

FOREIGN PATENT DOCUMENTS

EP 707 020 A2 4/1996

(Continued)

OTHER PUBLICATIONS

"Realization of a Blue-Light-Emitting Device Using Poly(*p*-phenylene)", Grem et al., Adv. Matter. 4, No. 1, 1992, pp. 36-37.
"Optical Characterisation of poly-2,5-diheptyl-1,4-phenylene-alt-2,5-thienylene", Loi et al., Synthetic Metals 111-112, 2000, pp. 519-522.

(Continued)

*Primary Examiner*—Duc Truong
(74) *Attorney, Agent, or Firm*—Marshall, Gerstein & Borun LLP

(57) ABSTRACT

A process for preparing a conjugated polymer, which comprises polymerizing in a reaction mixture (a) an aromatic monomer having at least two boron derivative functional groups selected from the group consisting of boronic acid groups, boronic ester groups, and borane groups, and an aromatic monomer having at least two reactive halide functional groups, or (b) an aromatic monomer having one reactive halide functional group and one boron derivative functional group selected from the group consisting of boronic acid groups, boronic ester groups, and borane groups, an amount of a catalyst suitable for catalyzing the polymerization of the aromatic monomers, and a base in an amount sufficient to convert the boron derivative functional groups into boron anionic groups, characterized in that the reaction mixture further comprises a first solvent and a second solvent with which said first solvent is substantially immiscible and an emulsifier in an amount sufficient to form an emulsion of the reaction mixture.

23 Claims, 1 Drawing Sheet

| | FOREIGN PATENT DOCUMENTS | |
|---|---|---|
| EP | 707 020 A3 | 4/1996 |
| GB | 2360291 | 9/2001 |
| WO | WO 99/54385 | 10/1999 |
| WO | WO 00/53656 | 9/2000 |
| WO | WO 00/55927 | 9/2000 |
| WO | WO 02/26859 A1 | 4/2002 |

OTHER PUBLICATIONS

"Polyglycerol as a High-Loading Support" for Boronic Acids with Application in Solution-Phase Suzuki Cross-Couplings, Hebel et al. et al., Journal of Organic Chemistry 67, 2002, pp. 9452-9455.

International Search Report in PCT/GB02/04752 dated Mar. 28, 2003.

US 7,074,884 B2

CONJUGATED POLYMER PREPARATION VIA SUZUKI-COUPLING IN EMULSION

This is the U.S. national phase of International Application No. PCT/GB02/104752 filed Oct. 22, 2002, the entire disclosure of which is incorporated herein by reference.

BACKGROUND OF THE INVENTION

1. Field of the Invention

The invention relates to a process for the preparation of a conjugated polymer, in particular conjugated polymers suitable for use as an active material in organic semiconductor devices including optical devices such as electroluminescent or photovoltaic devices.

2. Description of Related Technology

Conjugated polyarylenes are widely used as the active material in organic semiconductor devices. Examples of such materials include polyfluorenes as disclosed in, for example, WO 99/54385, spirofluorenes as disclosed in, for example, EP 0707020, polyphenylenes as disclosed in, for example, G. Grem, G. Leditzky, B. Ullrich, G. Leising, Adv. Mater. (1992), 4, 36 and phenylene-thienylene copolymers as disclosed in, for example, K. Kaeriyama et al, Synth. Met. (2000), 111–112, 519–522.

Polyarylenes may suitably be prepared by Suzuki or Yamamoto polymerization. Of these two techniques, Suzuki polymerization is the only technique that enables exertion of control over the regioregularity of the copolymer. Thus Suzuki polymerization may be used to generate AB, block, or random copolymers depending on the relative quantities of boron and halo monomers used.

It is desirable for polyarylenes for use in the aforementioned optical devices to be of high molecular weight as this improves their processability. High viscosity is also advantageous for certain applications. However, a known drawback of Suzuki polymerization is the difficulty in reproducibly generating high molecular weight polymers. This has been attributed to the problem of side reactions competing with the polymerization, e.g. reductive elimination and deboronation of the monomers, which limit the molecular weight of the polymer. These side reactions are initially relatively insignificant but become prevalent at longer reaction times. A fast reaction rate is therefore desirable from the point of view of obtaining high molecular weight material.

U.S. Pat. No. 5,777,070 discloses the use of the phase transfer catalyst tricaprylylmethyl ammonium chloride in Suzuki polymerization reactions to facilitate the movement of the reactive boronate species between the organic and aqueous phases of the reaction mixture. In an alternative approach, GB 2360291 describes the use of tetraalkyl ammonium boronate salts soluble in the organic phase such that the polymerization reaction takes place in a single phase.

SUMMARY OF THE INVENTION

It is desirable to provide a reproducible process for preparing high molecular weight conjugated polymers. It is also desirable to reduce reaction time for polymerization.

In a first aspect, the invention provides a process for preparing a conjugated polymer, which comprises polymerizing in a reaction mixture (a) an aromatic monomer having at least two boron derivative functional groups selected from the group consisting of boronic acid groups, boronic ester groups, and borane groups, and an aromatic monomer having at least two reactive halide functional groups; or (b) an aromatic monomer having one reactive halide functional group and one boron derivative functional group selected from the group consisting of boronic acid groups, boronic ester groups, and borane groups, an amount of a catalyst suitable for catalyzing the polymerization of the aromatic monomers; and a base in an amount sufficient to convert the boron derivative functional groups into boron anionic groups, characterized in that said reaction mixture further comprises a first solvent and a second solvent with which said first solvent is substantially immiscible and a emulsifier in an amount sufficient to form an emulsion of said reaction mixture.

In a second aspect, the invention provides a process for the production of an optical device or a component for an optical device, which comprises providing a substrate and producing a polymer in accordance with the process of any one of the preceding claims, whereby the polymer is supported by the substrate. Preferably, the optical device comprises an electroluminescent device or photovoltaic device.

The invention provides a method for the reproducible production of high molecular weight polymer in a short time. This is achieved by means of the emulsion which greatly increases the surface contact area between the two phases of the reaction mixture as compared with prior art systems.

BRIEF DESCRIPTION OF THE DRAWINGS

The invention will be illustrated by way of example only, with reference to the accompanying drawing in which:

the sole FIGURE shows the reaction of Example 1.

Figure 1:
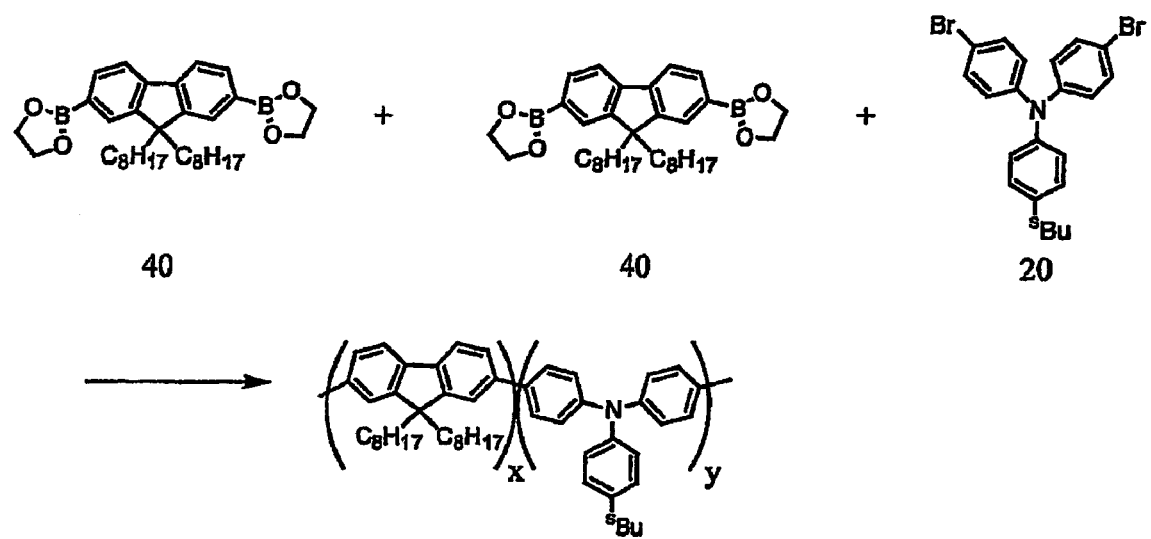

The process of the invention applies to the polymerization of monomers by Suzuki polymerization. Accordingly, known methodology for Suzuki polymerization as disclosed in, for example, WO 00/153656 or the aforementioned prior art, is applicable to the invention.

As used herein, the term "conjugated polymer" refers to either a fully conjugated polymer i.e. a polymer which is conjugated along the full length of its chain, or a partially conjugated polymer i.e. a polymer which contains conjugated segments together with non-conjugated segments.

The term "emulsion" refers to a colloidal suspension comprising a first solvent dispersed within a second solvent, or vice-versa, wherein each of said first and second solvents contain reactive species dissolved therein during at least part of the reaction.

The term "emulsifier" refers to a substance that coats the particles of the dispersed solvent and prevents coagulation of colloidal particles.

Preferably, the boron anionic group is of formula —B(OR)$_3$— wherein each R is independently selected from hydrogen or optionally substituted alkyl or aryl and two R groups may be linked.

Preferably, the emulsifier is used in an amount ranging from 1–20% w/v, more preferably in an amount ranging from 1–10% w/v.

Preferably, the first solvent is selected from the group consisting of alkylated aromatics. In a particular preferred aspect, the first solvent is toluene. The second solvent is preferably water. The ratio of first solvent to second solvent may range from 0.1:1 up to 10:1 by volume. Preferably, the ratio is in the range 1:1 up to 10:1.

Preferably, the monomers are selected from the group consisting of optionally substituted arylenes, heteroaromatics. and fused aromatic systems. In a particularly preferred aspect, at least one of the monomers comprises a triarylamine, a phenylene, a thiophene. a benzothiadiazole, or a fluorene wherein each of said monomers is optionally substituted by an alkyl or alkoxy group. Particularly preferred types of monomers include dialkyiphenylenes, dialkoxy phenylenes, substituted and non-substituted thiophenes and benzothiadiazoles, and dialkylfluorenes such as 9,9-di-n-octylfluorenes. One or more of the monomers could also be a pre-formed oligomeric or polymeric chain comprising several smaller units with the necessary functional groups provided at the desired positions on the chain.

It is also envisaged that under the appropriate reaction conditions, this invention could also be extended to the use of monomers in which some or all of the functional groups are not directly substituted on an aromatic ring, in particular to other kinds of unsaturated monomers.

The catalyst used in the method of the invention is preferably a palladium catalyst. The palladium catalyst may be a Pd (0) or Pd (II) species. Particularly preferred catalysts include Pd(Ph$_3$)$_4$ and PdCl$_2$(Ph$_3$P)$_2$. Typically, the amount of palladium catalyst in the reaction mixture is 0.01 to 1 mol. %, preferably about 0.15 mol. %, based on the total number of moles of monomers used.

The base may be an inorganic base such as a hydroxide, carbonate, or hydrogencarbonate of an alkali metal or alkaline earth metal. In a preferred aspect, the base is an organic base, for example a tetraalkylammonium hydroxide, tetraalkylammonium carbonate, or tetraalkylammonium hydrogencarbonate.

Preferably, greater than one equivalent of base per monomer with a boron functional derivative group or groups is provided in the reaction mixture. More preferably, the quantity of base used is up to two equivalents per monomer with a boron derivative functional group or groups.

Preferably, the polymer produced is a semiconductive conjugated polymer, in particular a semiconductive conjugated luminescent polymer.

The process of the invention may be applied to a wide range of aromatic monomers such as fluorenes, phenylenes, heteroaromatics and triarylamines.

Particularly preferred triarylamine repeat units derived from triarylamine monomers include units of formulae 1–6:

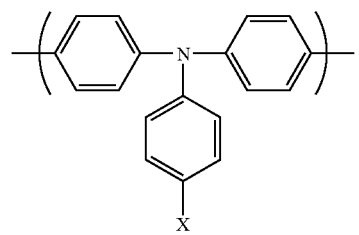

1

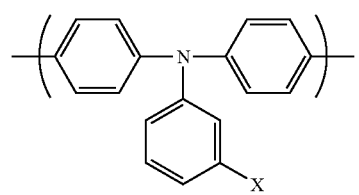

2

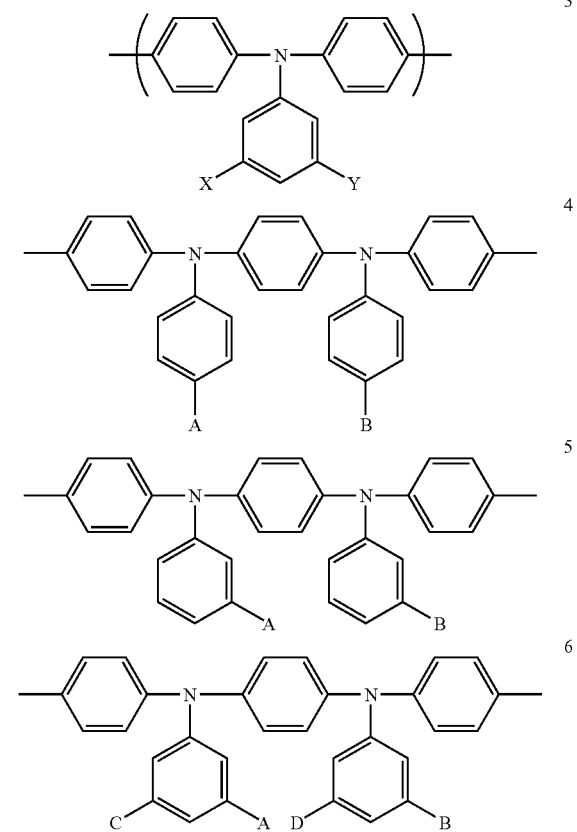

X and Y may be the same or different and are substituent groups. A, B, C and D may be the same or different and are substituent groups. It is preferred that one or more of X, Y, A, B, C and D is independently selected from the group consisting of alkyl, aryl, perfluoroalkyl, thioalkyl, cyano, alkoxy, heteroaryl, alkylaryl and arylalkyl groups. One or more of X, Y, A, B, C and D also may be hydrogen. It is preferred that one or more of X, Y, A, B, C and D is independently an unsubstituted, isobutyl group, an n-alkyl, an n-alkoxy or a trifluoromethyl group because they are suitable for helping to select the HOMO level and/or for improving solubility of the polymer.

Particularly preferred heteroaryl repeat units include units of formulae 7–21:

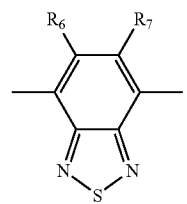

7 wherein $R_6$ and $R_7$ are the same or different and are each independently hydrogen or a substituent group, preferably alkyl, aryl, perfluoroalkyl, thioalkyl, cyano, alkoxy, heteroaryl, alkylaryl or arylalkyl. For ease of manufacture, $R_6$ and $R_7$ are preferably the same. More preferably, they are same and are each a phenyl group.

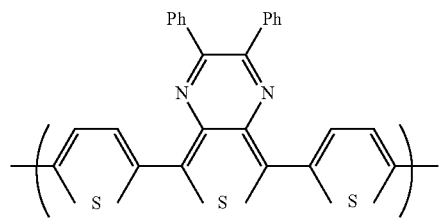 8
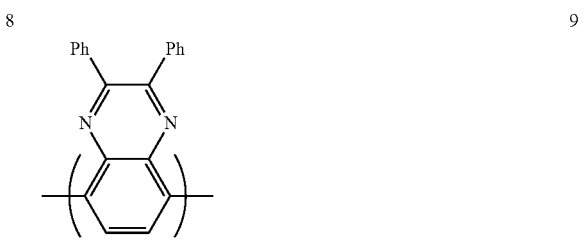 9
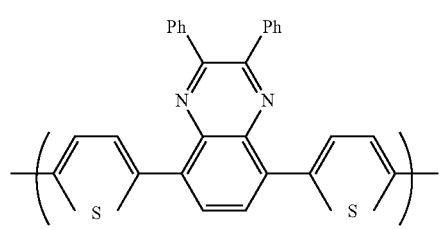 10
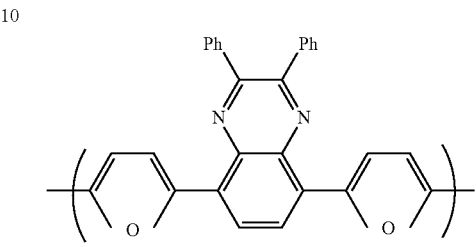 11
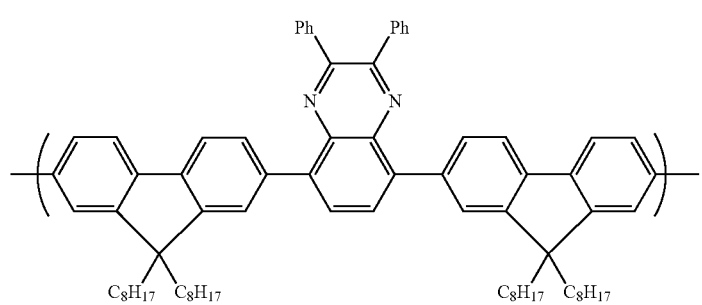 12
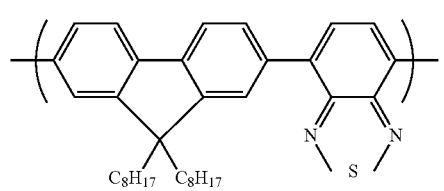 13
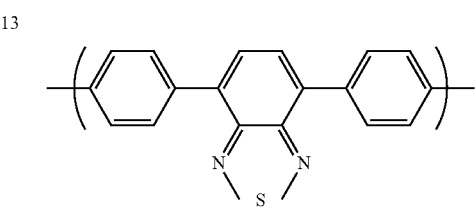 14
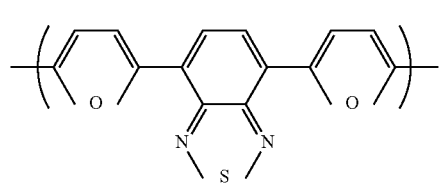 15
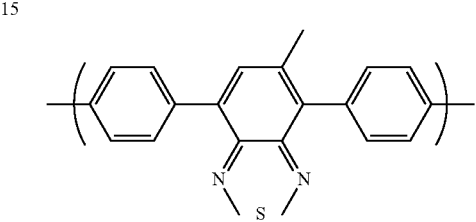 16
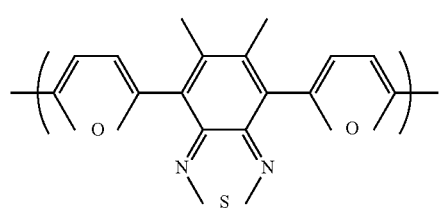 17
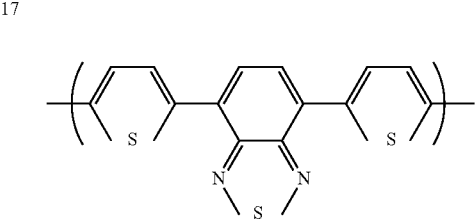 18

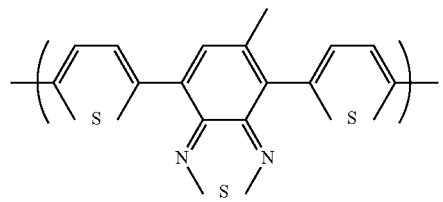

19

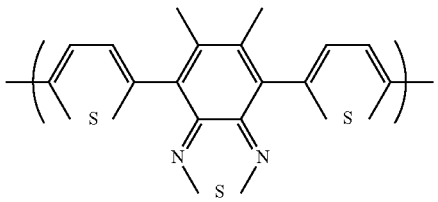

20

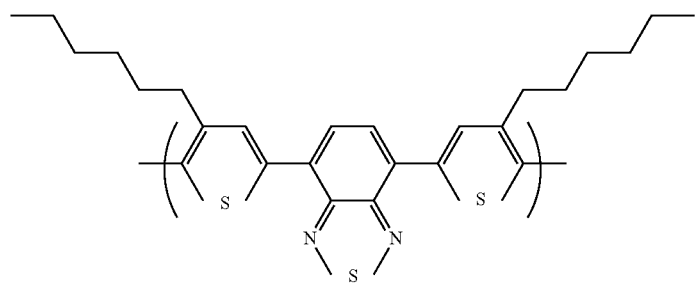

21

The first and second solvents may each independently comprise a single solvent or may comprise a blend of miscible solvents.

Examples of specific emulsifiers include the following, available from either Aldrich Chemicals or Raschig GmbH: poly(ethylene glycol)-block-polypropylene glycol)-block-poly(ethyleneglycol) Mn 4400, Mn 1100, Mn 1900, Mn 8400, Mn 5800, Mn 2800, or Mn 2000; poly(ethylene glycol) 4-nonylphenyl ether acrylate Mn 450, poly(ethylene glycol) 4-nonylphenyl 3-sulfopropyl ether, potassium salt 9 EO/Mole, 20 EO/Mole, poly(ethylene glycol) methyl ether Mn 350, Mn 550, Mn 750, Mn 2000, or Mn 5000; poly (ethylene glycol) n-alkyl 3-sulfopropyl ether, potassium salt 7 EO/mole or 11 EO/mole; poly(ethylene glycol) Mn 10000, Mn 8000, Mn 4600, Mn 3400, Mn 2000, Mn 1500, Mn 1000, Mn 600 or Mn 400; poly(propylene glycol) Mn 425, Mn 725, Mn 1000, Mn 2000, Mn 2700, Mn 3500; poly (propylene glycol) bis(2-aminopropyl ether) Mn 230, Mn 400, Mn 2000 or Mn 4000; poly(propylene glycol-block-polyethylene glycol)-block-polypropylene glycol) bis(2aminopropyl ether) Mn 600, Mn 900 or Mn 2000; poly(propylene glycol-block-polyethylene glycol)-block-polypropylene glycol) Mn 419, Mn 2000, Mn 2700 or Mn 3300; poly(propylene glycol) monobutyl ether Mn 340, Mn 1000, Mn 1200, Mn 2500 or Mn 4000; polyethyleneglycolalpha-(4-nonylphenyl)-omega-3-sulfopropyl-diether, potassium salt; Cocoamidopropylbetaine; Polyethyleneglycol octyl-(3-sulfopropyl)-diether potassium salt; Octaethylene glycol octyl ether; Polyethyleneglycol alkyl-3-sulfopropyl diether, potassium salt; Polyethyleneglycol alkyl-3sulfopropyl diether, potassium salt; Polyethyleneglycol alkyl-3-sulfopropyl diether, potassium salt or N,N-Dimethyl-N-hydrogenated-tallow alkyl-N-(3-sulfopropyl) ammonium betaine.

Polymers preparable according to the invention include, but are not limited to, straight chain, branched and dendrimeric polymers.

These polymers may have hole transporting, electron transporting and/or emissive properties. The polymer may have one or more of these properties. Where the polymer has more than one of these properties, different properties may be provided by different segments of the polymer, in particular segments of the polymer backbone as described in WO 00/55927 or pendant groups as described in WO 02/26859. Alternatively, if the polymer of the invention has only one or two of the properties of hole transport, electron transport and emission, it may be blended with one or more further polymers having the remaining required property or properties.

As described above, the monomers must each have the appropriate functional groups for the Suzuki reaction. In one arrangement, a first reactive dihalide monomer is polymerised with a second monomer having two boron derivative functional groups. In this arrangement the first and the second monomers may be the same or different.

In a second arrangement, a monomer having a boron derivative functional group and a reactive halide functional group is polymerized to form a homopolymer. It is also possible to form copolymers from this second arrangement simply by polymerizing together two or more different types of monomers each containing both functionalities.

Preferably, the reactive halide functional group on the reactive dihalide monomer or the monomer having the reactive halide functional group is Br or I although it is possible to use instead groups such as chlorine, triflate ($CF_3SO_3$—), tosylate and mesylate. With respect to the boron-derivative functional groups, the boronic acid group is represented by —$B(OH)_2$; the boronic ester group is preferably —$B(OR^1)(OR^2)$ or —$B(OR^5O)$ and the borane group is preferably —$BR_3R_4$, wherein $R^1$ is a substituted or non-substituted $C_1$–$C_6$ alkyl group and $R^2$ is H or a substituted or non-substituted $C_1$–$C_6$ alkyl group; $R_3$ and $R_4$ are each independently substituted or nonsubstituted $C_1$–$C_6$ alkyl groups, and $R_5$ is a substituted or non-substituted divalent hydrocarbon radical resulting in a 5 or 6 membered ester ring. Examples of suitable groups as $R_5$ include substituted or non-substituted C2 or C3 alkylene groups, or substituted or non-substituted ortho- or meta-phenylene groups.

Suitable boronic ester groups include, for example, the products of esterification of the corresponding boronic acid group with monovalent $C_1$–$C_8$ alcohols, ethane diols such as ethylene glycol, pinacol, propane diols or ortho aromatic diols such as 1,2-dihydroxybenzene.

EXAMPLES

General Method

Apparatus 5-neck, single jacketed reaction vessel, fitted with reflux condenser, internal thermometer probe (PT100), nitrogen inlet and exhaust, PTFE-coated stirrer shaft, blade and guide (anchor stirrer) and two stoppers. Each glass joint is coated with a PTFE sleeve. The stirrer motor (mechanically driven, overhead) is equipped with an on-line torque meter. Materials of construction are a glass reactor with glass overhead fittings and ground glass joints; all stirrer shafts, probes and ancillary equipment are PTFE coated mild steel.

A suitable heater/chiller unit, e.g. Julabo F25 HP programmable, connected to the reactor via M16 fittings and with 2 m hoses.

A suitable stirrer motor for the reactor, e.g. an IKA Eurostar power control visk or any appropriate overhead mechanical stirrer motor.

Procedure

A reaction vessel as described above was charged with 9,9-dioctyifluorene-2,7di(ethylenylboronate) (50.56 g; 95.33 mmol; 1.0 eq.), 2,7-dibromo-9,9'-dioctylfluorene (41.83 g; 76.26 mmol; 0.8 eq.), N,N-bis(4-bromophenyl)-N-(4-sec-butylphenyl)amine (8.76 g; 19.07 mmol; 0.2 eq.), toluene and emulsifier. The mixture was stirred for 5 minutes at room temperature and then degassed for one hour with a nitrogen sparge. Dichloro-bis(triphenylphosphine) palladium (0.21 g; 0.3 mmol; 0.003 eq.) was then added and followed by addition of 20% w/w aqueous tetraethylammonium hydroxide (available from Fluka Chemicals) (320 mL) at which point formation of an emulsion was observed. The stirring mixture was heated to arid maintained at reflux until the torque or viscosity no longer increased, or the reaction mixture gelled. In the event of gellation, additional toluene was added.

The reaction was terminated by addition of bromobenzene (1–2 ml) followed by stirring at reflux for an hour before adding phenyl boronic acid (1.52–2.0 g), after which the mixture was allowed to stir at reflux for a further hour.

The mixture was allowed to cool to room temperature and poured slowly into methanol to precipitate the polymer. Bromobenzene (1–2 ml) was added to the mixture, which was allowed to stir at reflux for a further hour before adding phenyl boronic acid (1.5–2.0 g), after which the mixture was allowed to stir at reflux for one hour.

The mixture was allowed to cool to room temperature and poured slowly into methanol to precipitate the polymer. The crude polymer was recovered by filtration, washed with fresh methanol polymer and then redissolved in toluene. The toluene solution was warmed to 65° C. and washed with diethyldithiocarbamic acid sodium salt solution, dilute hydrochloric add, aqueous sodium acetate and deionized water. The toluene phase was separated and filtered through Celite 545 (available from Aldrich Chemicals) and eluted with toluene. The toluene eluant was then concentrated in vacuo, the polymer was precipitated from it with methanol, isolated by filtration and dried in vacuo.

The reaction was performed with varying emulsifiers, quantities of emulsifiers, and quantities of solvents as illustrated in the table below wherein percentage weight of emulsifier per unit volume is calculated by multiplying the weight of emulsifier in grammes by the combined volume of toluene and aqueous base in milliliters.

| Example | Emulsifier (g; % w/v) | Toluene (mL) | Product Mp |
|---|---|---|---|
| 1 | PEG-PPG-PEG Mn 4400 (82 g; 10) | 500 | 205,000[1] |
| 2 | PEG-PPG-PEG Mn 4400 (20.5 g; 2.5) | 500 | 304,000[1] |
| 3 | PEG-PPG-PEG Mn 4400 (82 g; 6.2) | 1000 | 323,000[1] |
| 4 | PEG-PPG-PEG Mn 4400 (82 g; 4.5) | 1500 | 379,000[2] |
| 5 | PEG-PPG-PEG Mn 4400 (82 g; 3.5) | 2000 | 330,000[1] |
| 6 | PEG-PPG-PEG Mn 4400 (82 g; 2.9) | 2500 | 320,000[1] |
| 7 | PEG-4NP-3SPE (30 g; 2.2) | 1000 | 302,000[1] |

[1] Mp after purification
[2] Mp before end-capping

The invention claimed is:

1. A process for preparing a conjugated polymer, which comprises polymerizing in a reaction mixture (a) an aromatic monomer having at least two boron derivative functional groups selected from the group consisting of boronic acid groups, boronic ester groups, and borane groups, and an aromatic monomer having at least two reactive halide functional groups; or (b) an aromatic monomer having one reactive halide functional group and one boron derivative functional group selected from the group consisting of boronic acid groups, boronic ester groups, and borane groups; an amount of a catalyst suitable for catalyzing the polymerization of the aromatic monomers; and a base in an amount sufficient to convert the boron derivative functional groups into boron anionic groups, wherein said reaction mixture further comprises a first solvent and a second solvent with which said first solvent is substantially immiscible and an emulsifier in an amount sufficient to form an emulsion of said reaction mixture.

2. A method according to claim 1 wherein the boron anionic group is of formula —B(OR)$_3$— wherein each R is independently selected from the group consisting of hydrogen and optionally substituted alkyl and aryl groups and wherein two R groups may be linked.

3. A method according to claim 1 wherein the emulsifier is a neutral species.

4. A method according to claim 1 wherein the emulsifier is an anionic species.

5. A method according to claim 3 wherein the emulsifier is selected from the group consisting of poly(alkylene glycols) and alkylsulfonate salts.

6. A method according to claim 1 comprising using the emulsifier in an amount ranging from 1–20% w/v.

7. A method according to claim 1 comprising using the emulsifier in an amount ranging from 1–10% w/v.

8. A method according to claim 1 wherein the first solvent is selected from the group consisting of alkylated aromatics.

9. A method according to claim 8 wherein the first solvent is toluene.

10. A method according to claim 1 wherein the second solvent is water.

11. A method according to claim 1 wherein the ratio of first solvent to second solvent is in the range 0.1:1 to 10:1.

12. A method according to claim 1 wherein the monomers are selected from the group consisting of optionally substituted arylenes, heteroaromatics, and fused aromatic systems.

13. A method according to claim 12 wherein at least one of the monomers comprises a triarylamine, a phenylene, a thiophene, a benzothiadiazole or a fluorene wherein each of said monomers is optionally substituted by an alkyl or alkoxy group.

14. A method according to claim 1 wherein the catalyst comprises a palladium (0) or palladium (II) species.

15. A method according to claim 14 wherein the amount of palladium catalyst in the reaction mixture is 0.01 to 1 mol. % based on the total number of moles of monomers used.

16. A method according to claim 1 wherein the base is an organic base.

17. A method according to claim 16 wherein the base is a tetraalkylammonium hydroxide, tetraalkylammonium carbonate or tetraallcylammonium hydrogen carbonate.

18. A method according to claim 1 comprising providing greater than one equivalent of base per monomer with boron functional derivative group or groups in the reaction mixture.

19. A process according to claim 1 wherein the polymer produced is a semiconductive conjugated polymer.

20. A process according to claim 19 wherein the semiconductive conjugated polymer is a luminescent polymer.

21. A process for the production of an optical device or a component for an optical device, which comprises providing a substrate and producing a polymer in accordance with the process of claim 1 whereby the polymer is supported by the substrate.

22. A process according to claim 21, wherein the optical device comprises an electroluminescent device.

23. A method according to claim 4 wherein the emulsifier is selected from the group consisting of poly(alkylene glycols) and alkylsulfonate salts.

* * * * *